United States Patent [19]

Schuler

[11] 4,249,542
[45] Feb. 10, 1981

[54] COMBINE

[76] Inventor: Murry W. Schuler, Box 66, Rte. #2, Griswold, Iowa 51535

[21] Appl. No.: 105,943

[22] Filed: Dec. 20, 1979

[51] Int. Cl.³ .................... A01F 7/06; A01F 12/18
[52] U.S. Cl. .................. 130/27 T; 130/27 H; 130/27 P
[58] Field of Search ............. 130/27 T, 27 P, 27 H, 130/27 Q, 37 H, 27 HA, 27 M, 6; 56/14.6

[56] References Cited

U.S. PATENT DOCUMENTS

| | | | |
|---|---|---|---|
| 50,740 | 10/1865 | Shaw et al. | 130/6 |
| 643,161 | 2/1900 | Rowe | 130/6 |
| 932,889 | 8/1909 | McMillin | 130/6 |
| 2,905,182 | 9/1959 | Wise | 130/27 M |
| 3,306,302 | 2/1967 | Mark et al. | 130/27 H |
| 3,844,293 | 10/1974 | Young | 130/6 |
| 4,198,802 | 4/1980 | Hengen et al. | 130/27 T |

*Primary Examiner*—Paul J. Hirsch
*Attorney, Agent, or Firm*—Zarley, McKee, Thomte, Voorhees & Sease

[57] ABSTRACT

A combine is described including a longitudinally extending auger which is mounted in a tubular casing. The auger is provided with spiral flighting for conveying cut crop material rearwardly between the exterior surface of the auger and the interior surface of the tubular casing. A longitudinally extending threshing cylinder is mounted on the rearward end of the auger for rotation therewith. The cylinder has a flared configuration with its rearward end having a larger diameter than its forward end. A longitudinally extending concave embraces the cylinder and is longitudinally adjustably movably mounted with respect to the cylinder. The concave also has a flared configuration so that its rearward end has a larger diameter than its forward end and is spaced from the cylinder to define a threshing space therebetween. The forward end of the concave is in communication with the rearward end of the auger so that cut crop material will be delivered to the forward portion of the threshing space. The means for longitudinally adjustably moving the concave with respect to the cylinder comprises a power cylinder apparatus.

8 Claims, 6 Drawing Figures

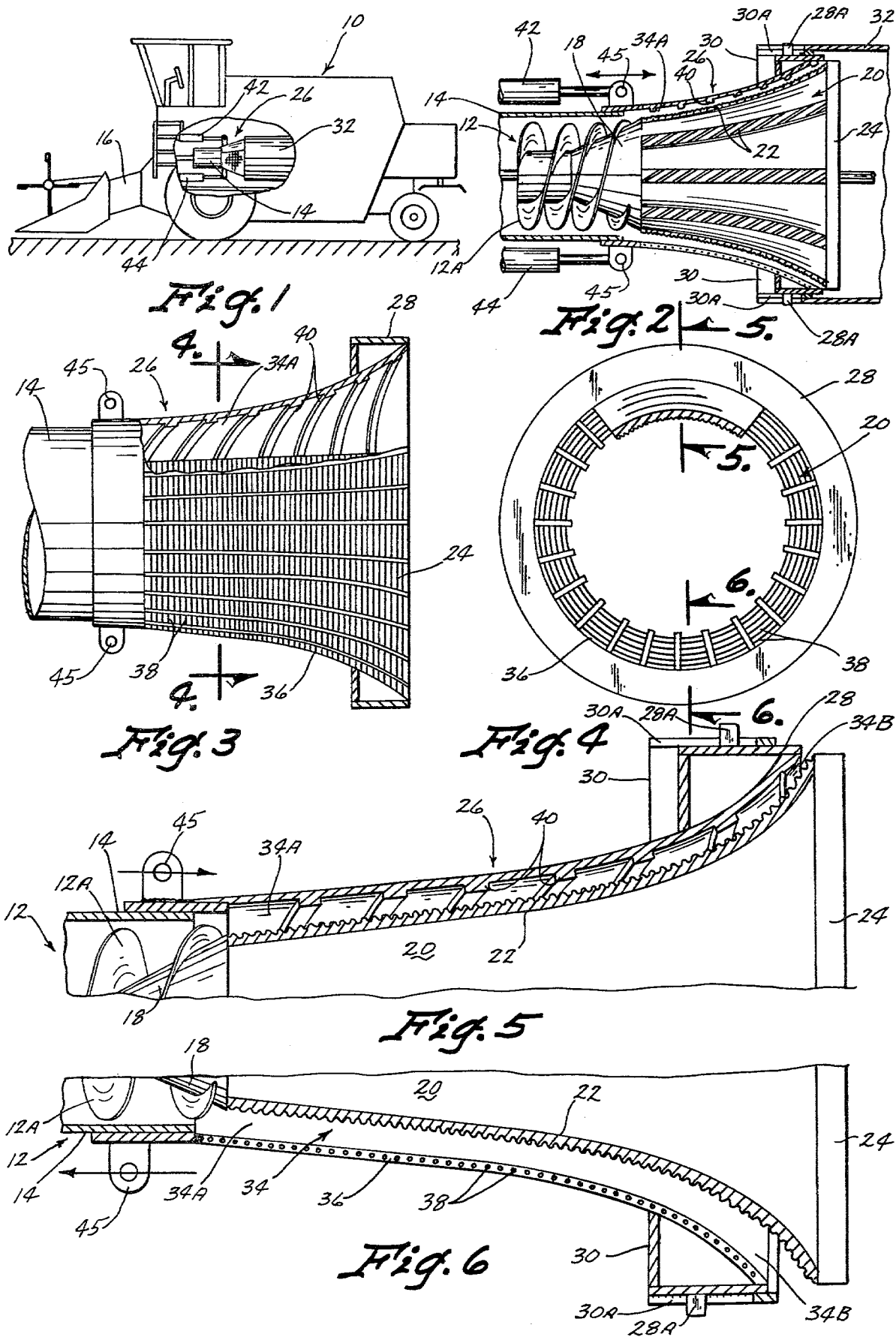

4,249,542

COMBINE

BACKGROUND OF THE INVENTION

This invention relates to a combine and more particularly to a combine which may be described as being of the axial flow type. Generally speaking, combines historically included a threshing cylinder which was transversely mounted in the combine with respect to the flow of crop material therethrough. A concave was normally positioned at the lower portion of the cylinder so that the cut crop material would be forced between the exterior surface of the cylinder and the concave to thresh and separate the grain from the chaff and straw.

A recent development in the combine art has been the axial flow type combines wherein the threshing cylinder is positioned in the combine in a longitudinally extending manner. For example, the Sperry-New Holland TR70 combine employs a pair of threshing cylinders or rotors which are mounted in tubular members having concaves or grates at the lower end thereof. While the axial flow combines such as that of Sperry-New Holland are regarded by some as to be an improvement in the art, the instant invention is believed to achieve more uniform combining action with less grain damage.

It is therefore a principal object of the invention to provide an improved combine.

A still further object of the invention is to provide a longitudinally extending threshing cylinder having a flared configuration rotatably mounted within a flared concave so that greater threshing efficiency is achieved while reducing the amount of grain damage.

A still further object of the invention is to provide an improved combine wherein a flared concave longitudinally movably embraces a flared threshing cylinder so that the threshing clearance or space therebetween may be easily adjusted.

A still further object of the invention is to provide a threshing cylinder and concave arrangement for a combine which is economical of manufacture and durable in use.

These and other objects will be apparent to those skilled in the art.

BRIEF DESCRIPTION OF THE DRAWINGS

FIG. 1 is a side view of a combine with a portion thereof cut away to illustrate the threshing cylinder and concave apparatus of this invention;

FIG. 2 is a longitudinal sectional view of the invention;

FIG. 3 is a partial side view of the concave portion of this invention with a portion thereof cut away to more fully illustrate the invention;

FIG. 4 is a sectional view seen on lines 4—4 of FIG. 3;

FIG. 5 is an enlarged sectional view seen on lines 5—5 of FIG. 4; and

FIG. 6 is a sectional view seen on lines 6—6 of FIG. 4.

SUMMARY OF THE INVENTION

A threshing cylinder and concave is disclosed for use in a combine to achieve greater threshing efficiency while reducing the amount of grain damage. A flared cylinder is mounted at the rearward end of a crop conveying auger for rotation therewith. The crop conveying auger is mounted in a casing so that the cut crop material is conveyed rearwardly to the forward end of the cylinder. A flared concave longitudinally movably embraces the cylinder and is spaced outwardly therefrom to define a threshing space or area therebetween. Power cylinders are connected to the concave for longitudinally moving the concave relative to the cylinder so that the cross-sectional area of the threshing space may be selectively varied. Approximately 80% of the interior of concave is of the open-grate type with the upper 20% thereof being provided with crop distribution flighting. The arcuately flared concave and cylinder permit a maximum adjustment therebetween with a minimum of longitudinal displacement as compared to purely conically shaped components.

DESCRIPTION OF THE PREFERRED EMBODIMENT

The numeral 10 refers generally to a combine which is conventional in all features except for the threshing cylinder and concave and structure related thereto. As seen in the drawings, the numeral 12 refers to an auger which is rotatably mounted in a casing or tubular member 14 so that the cut crop material will be conveyed rearwardly from the header 16 towards the threshing portion of the combine. The cut crop material is conveyed rearwardly through the casing 14 between the exterior surface of the auger 12 and the interior surface of the casing 14. As seen in FIG. 2, the rearward portion of auger 12 includes a frusto-conical shaped portion referred to generally by the reference numeral 18.

The numeral 20 refers to the threshing cylinder portion of this invention and which is seen to have a flared configuration so that the rearward end thereof has a larger diameter than the forward end thereof. A plurality of rasp bars 22 are operatively secured to the rearward end of the auger 12 and extend rearwardly and outwardly therefrom. As seen in FIG. 2, the rasp bars 22 are curved along their length. The rearward ends of the rasp bars 22 are secured to a disc member 24. It is important to note that the configuration of the cylinder 20 is flared rather than frusto-conical. In other words, the configuration of cylinder 20 is bell-shaped.

Concave 26 is positioned around cylinder 20 and also has a flared or bell-shaped configuration. The forward end of concave 26 embraces the rearward end of casing 14 as best seen in FIGS. 5 and 6. The rearward end of concave 26 is provided with a support 28 which is movably received within ring 30 provided at the inner forward end of tubular member 32. Guide pins 28A extend through elongated slots 30A and slots 32A in tubular member 32 to keep the concave 26 from rotating with the cylinder 20. It should be noted that the longitudinal cross-sectional configuration of cylinder 20 and concave 26 is slightly different so that the clearance between the cylinder 20 and the concave 26 at the forward end of cylinder 20 is normally larger than the clearance between the rearward ends of cylinder 20 and concave 26. The tapered space between the exterior surface of cylinder 20 and the interior surface of concave 26 will be referred to generally by the reference numeral 34. Concave 26 is provided with conventional rods 36 and wires 38 to achieve the open-grate effect. It should be noted that casing 14 is of the open-grate type for approximately 80% of its surface insasmuch as the upper 20% of concave 26 is closed and is provided with spiral flighting 40 at the interior surface thereof. The purpose of the spiral flighting 40 is to provide to the cut crop material a controlled movement to the discharge end of the concave. The numerals 42 and 44 refer to power cylinders which are secured to ears 45 at the forward end of concave 26 and which may be actuated to longitudinally move concave 26 relative to cylinder 20 as will be described in more detail hereinafter. The cylinders 42 and 44 can be disposed at the sides of the unit rather than at the top and bottom thereof if more clearance is needed for the incoming grain. Double flighting 12A may be used as required on auger 12 to insure that an adequate supply of grain is provided to the unit.

In operation, the combine would be operated in conventional fashion with auger 12 being rotated so that the cut crop material will be conveyed rearwardly through the casing 14. Rotation of the auger 12 also causes rotation of the cylinder 20. The cut crop material is delivered to the threshing space 34 at the forward end of cylinder 20 in the area referred to generally by the reference numeral 34A. The rotating cylinder 20 threshed and at least partially separates the grain from the chaff and straw due to the action of the rasp bars 22 striking the crop material. A portion of the grain drops through the open-grate portion of the concave 26 in conventional fashion. The spiral flighting 40 as well as the centrifugal action of the rotating cylinder 20 causes the material to be given a controlled movement to the discharge end of the threshing space 34 which is referred to by the reference numeral 34B. As seen in the drawings, the cross-sectional area of the threshing space 34 decreases from 34A to 34B. The configuration of the threshing space as well as the increases rim speed of the cylinder 20 cooperate to give a final on the crop material reaching the rearward area of the threshing space 34 which has not been previously threshed or separated.

The threshing space 34 may be easily varied by simply actuating the hydraulic cylinders 42 and 44 to longitudinally move concave 26 relative to cylinder 20. The fact the cross-sectional area of threshing space 34 may be easily varied permits the combine to be readily adaptable for crop conditions, different crops, etc. The threshing space 34 may be easily changed from the operator's cab. It can be appreciated that retraction of the rods within the cylinders 42 and 44 will cause the forward movement of the concave 26 relative to the cylinder 20 which will obviously change the cross-sectional area of threshing space 34. Conversely, extension of the rods from cylinders 42 and 44 will move the concave 26 rearwardly with respect to the cylinder 20 so that the cross-sectional area of space 34 or the clearance between the cylinder 20 and concave 26 will be changed as indicated.

Thus it can be seen that a novel threshing cylinder and concave has been provided for a combine which not only permits rapid adjustment of the concave relative to the cylinder but which also increases the efficiency of the threshing action as well as reducing grain damage. It should also be noted that the adjustment of the clearance space between cylinder 20 concave 26 is made possible with a smaller amount of movement of the concave 26 due to the flared configuration of cylinder 20 and concave 26 than that which would be required if the cylinder 20 and concave 26 were both of the frusto-conical shape.

Thus it can be seen that the invention accomplishes at least all of its stated objectives.

What is claimed is:

1. In a combine,
   a longitudinally extending auger having rearward and forward ends and being mounted in a first casing spaced outwardly therefrom,
   said auger comprising a second casing having spiral flighting thereon for conveying cut crop material rearwardly between the exterior surface of said second casing and the interior surface of said second casing,
   means for rotating said auger,
   a longitudinally extending threshing cylinder mounted on the rearward end of said auger for rotation therewith and having rearward and forward ends
   said cylinder having an arcuately flared configuration with its rearward end having a larger diameter than its forward end,
   a longitudinally extending concave longitudinally adjustably movably embracing said cylinder and having rearward and forward ends,
   said concave being spaced from said cylinder to define a threshing space therebetween,
   said concave having an arcuately flared configuration with its rearward end having a larger diameter than its forward end,
   the forward end of said concave being in communication with the rearward end of said first casing whereby the cut crop material will be delivered by said auger to the forward portion of said threshing space,
   and means for longitudinally adjustably moving said concave relative to said cylinder whereby the cross-sectional area of said threshing space may be selectively varied.

2. The combine of claim 1 wherein said means for adjustably moving said concave comprises a hydraulic cylinder means connected thereto.

3. The combine of claim 1 wherein the forward end of said concave longitudinally movably embraces the rearward end of said first casing.

4. The combine of claim 1 wherein the upper interior surface of said concave is provided with crop distribution flighting.

5. The combine of claim 4 wherein said crop distribution flighting extends around approximately 20% of the upper interior surface of said concave.

6. The combine of claim 1 wherein said cylinder has a plurality of longitudinally extending rasp bars mounted thereon in a spaced relationship, each of said rasp bars being curved along its length.

7. The combine of claim 1 wherein the cross-sectional area of the forward end of said threshing space is normally greater than the cross-sectional area of the rearward end of said threshing space.

8. The device of claim 1 wherein guide means interconnects said concave and said cylinder to prevent rotation of said concave with said cylinder.

* * * * *